United States Patent
Ahmed et al.

(10) Patent No.: US 10,133,776 B2
(45) Date of Patent: Nov. 20, 2018

(54) TRANSFORMING A QUERY BY ELIMINATING A SUBQUERY

(71) Applicant: Oracle International Corporation, Redwood Shores, CA (US)

(72) Inventors: Rafi Ahmed, Fremont, CA (US); Mohamed Zait, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 286 days.

(21) Appl. No.: 13/923,216

(22) Filed: Jun. 20, 2013

(65) Prior Publication Data

US 2014/0379690 A1 Dec. 25, 2014

(51) Int. Cl.
G06F 17/30 (2006.01)

(52) U.S. Cl.
CPC .. G06F 17/30451 (2013.01); G06F 17/30454 (2013.01); G06F 17/30466 (2013.01); *G06F 17/30448* (2013.01)

(58) Field of Classification Search
None
See application file for complete search history.

(56) References Cited

U.S. PATENT DOCUMENTS

| | | | |
|---|---|---|---|
| 5,724,570 A * | 3/1998 | Zeller et al. | |
| 6,411,951 B1 * | 6/2002 | Galindo-Legaria et al. | |
| 6,529,896 B1 * | 3/2003 | Leung et al. | |
| 6,615,203 B1 * | 9/2003 | Lin et al. | |
| 6,826,562 B1 * | 11/2004 | Leung et al. | 707/713 |
| 2004/0220923 A1 * | 11/2004 | Nica | 707/3 |
| 2005/0097099 A1 | 5/2005 | Kapoor et al. | |
| 2005/0108206 A1 * | 5/2005 | Lam | G06F 17/30233 |
| 2006/0161521 A1 * | 7/2006 | Dettinger | G06F 17/3043 |
| 2006/0230017 A1 | 10/2006 | Larson | |
| 2010/0287185 A1 * | 11/2010 | Cras | G06F 17/30439 707/769 |
| 2012/0197919 A1 * | 8/2012 | Chen | G06F 17/30 707/757 |

(Continued)

OTHER PUBLICATIONS

U.S. Appl. No. 13/552,419, filed Jul. 18, 2012, Notice of Allowance, dated May 28, 2013.

*Primary Examiner* — Christopher J Raab
(74) *Attorney, Agent, or Firm* — Hickman Palermo Becker Bingham LLP

(57) ABSTRACT

A method, apparatus, and stored instructions are provided for transforming an initial query by eliminating a subquery nested within the initial query. The initial query may include an outer query that references a first instance of a particular data object. The initial query may also include set operator(s). At least a particular set operator may include a particular subquery that references a different instance of the particular data object. A query processor may transform the initial query to a transformed query that excludes the particular set operator and the particular subquery. The transformed query may instead include an added predicate that is based at least in part on the particular subquery. The added predicate may reference the first instance of the particular data object without referencing the different instance of the particular data object. The transformed query may be used for query execution instead of the initial query.

26 Claims, 3 Drawing Sheets

(56) References Cited

U.S. PATENT DOCUMENTS

2012/0215810 A1\* 8/2012 Evans ............... G06F 17/30489
　　　　　　　　　　　　　　　　　　　　707/771
2013/0124500 A1\* 5/2013 Beavin .............. G06F 17/30448
　　　　　　　　　　　　　　　　　　　　707/714

\* cited by examiner

TRANSFORMING A QUERY BY ELIMINATING A SUBQUERY

CROSS-REFERENCE TO RELATED APPLICATIONS

This application is related to U.S. patent application entitled, "TRANSFORMING CORRELATED SCALAR SUBQUERIES," U.S. Ser. No. 13/552,419, filed on Jul. 18, 2012 by Rafi Ahmed, the contents of which is hereby incorporated by reference herein in its entirety. This application is also related to U.S. patent application entitled, "EFFICIENT INTERACTION AMONG COST-BASED TRANSFORMATIONS," U.S. Ser. No. 11/716,126, filed on Mar. 8, 2007, by Rafi Ahmed and Allison Lee, the contents of which is hereby incorporated by reference herein in its entirety.

TECHNICAL FIELD

The technical field relates to query transformation and optimization.

BACKGROUND

Query Processing

A query is an expression, command, or set of commands that, when executed, causes a server to perform an operation on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects.

A table is an example database object that stores data in column(s) and row(s). A view is a database object that is defined by an expression, such as a subquery, that references other data object(s), such as table(s). Tables, views, or other data objects may be instantiated from within a query by referencing the data object in the FROM clause. Instantiating a data object in a query causes the data object to be assigned a reference name, such as "T1," "T2," or "EMPLOYEES" for a table, and causes data from the data object to be loaded, often into working memory, for further processing by other operation(s) in the query.

The query may perform operations on data from the source data object(s) on a row-by-row basis as the object(s) are loaded or on the entire source data object(s) after the object(s) have been loaded. A result set generated by some operation(s) may be made available to other operation(s), and, in this manner, the result set may be filtered or narrowed based on some criteria, and/or joined with other result set(s) and/or other source data object(s).

Example operations that may be performed on the source data object(s) include, but are not limited to, WHERE, GROUP BY, HAVING, SELECT, and ORDER BY. A query processor may evaluate separate operations of the query in a predictable order. For example, the order of precedence may be FROM, WHERE, GROUP BY, HAVING, SELECT, and ORDER BY. Query processors may vary the order if varying the order is predicted to be more efficient as long as the varying the order would not change a result of the query.

Filter predicate(s) may appear in the WHERE clause to remove rows that do not satisfy conditions specified in the filter predicate(s). For example, a filter predicate may remove rows for employees from an employee table that are not in the "marketing" department. Conditions in filter predicate(s) may be related to each other with logical operators such as AND (for "conjunctive predicates") or OR (for "disjunctive predicates"). The "AND" operators connect filter predicates to form a complex filter predicate that is satisfied when both of the connected filter predicates are satisfied. The "OR" operators connect filter predicates to form a complex filter predicate that is satisfied when either or both of the connected filter predicates is satisfied.

"Set operators" are logical operators that operate on a set of discrete items, such as a set of rows. Example set operators include, but are not limited to, "ALL," "ANY" or "SOME," "EXISTS," "NOT EXISTS," "IN," and "NOT IN." The "ALL" operator evaluates a set of zero or more items and is satisfied only when all of the evaluated items in the set satisfy a condition, such as a condition specified by an equality or other relational operator that modifies the ALL operator. The "NOT EXISTS" operator is satisfied only when all of the evaluated items in the set satisfy a non-existence of resulting rows condition. The "NOT IN" operator is equivalent to <>ALL (not equal to ALL) operator. In scenarios where the operators are determined to be satisfied as a result of evaluating the operators, the "ALL," "NOT EXISTS," and "NOT IN" operators involve the analysis of all of the items against the condition. In other words, all items are analyzed before any TRUE result of the operator may be determined. Conversely, in scenarios where the operators are determined to be not satisfied as a result of evaluating the operators, the FALSE result may be returned once any item in the set fails to satisfy the condition, and further analysis of other items in the set would not change this FALSE result. For example, NOT EXISTS(A) evaluates to FALSE as soon as any row of A exists, but evaluates to TRUE if, after analyzing all rows of A, no rows exist.

The "ANY" or "SOME" operator evaluates zero or more items and is satisfied when any one or more of the items in the set satisfies a condition, such as a condition specified by an equality or other relational operator that modifies the ANY or SOME operator. Similarly, the "EXISTS" operator is satisfied when any one or more of the items in the set satisfies an existence of resulting rows condition. The "IN" operator is satisfied is equivalent to the =ANY (equal to ANY) operator. In scenarios where the operators are determined to be satisfied as a result of evaluating the operators, the "ANY," "SOME," "EXISTS," or "IN" operators involve the analysis of items in the set against the condition until any item in the set satisfies the condition; once an item in the set satisfies the condition, further analysis of other items in the set does not change a TRUE result of these operators. Conversely, in scenarios where the operators are determined to be not satisfied as a result of evaluating the operators, these operators involve the analysis of all of the items against the condition. In other words, all items are analyzed before any FALSE result of the operator may be determined. For example, EXISTS(A) evaluates to TRUE as soon as any row of A exists, but evaluates to FALSE if, after analyzing all rows of A, no rows exist.

Filter predicates, logical combinations of filter predicates, and logical operators may be negated by the "NOT" operator. For example, an operator or combination thereof that would have returned "TRUE" would instead return "FALSE," and vise versa, if modified by the "NOT" operator.

A subquery is a portion of a query that excludes other portion(s) of the query and that may be evaluated separately from the other portion(s) of the query. The other portion(s) of the query may form an outer query, which may or may not include other subqueries. A subquery nested in the outer query may be separately evaluated one or more times while a result is computed for the outer query. In one example, the subquery may have a SELECT clause, a FROM clause, and a WHERE clause that are separate from a SELECT clause, a FROM clause, and a WHERE clause of the outer query. The select clauses select values from the source objects that are referenced in the FROM clause, and the WHERE clause either filters out or nullifies results that do not satisfy condition(s) specified in the WHERE clause. A subquery may return a result set that includes row(s) of selected column(s), or the subquery may return a single selected value.

In query optimization, a query optimizer or other query processor may transform queries from one form to another form as long as the two forms are semantically equivalent to each other. As used herein, a query is "transformed" when the query is (a) rewritten from a first form to a second form, (b) received in a manner that specifies a first set of operations, such as a first form or a first execution plan, and executed using a second set of operations, such as the operations specified by a second form or second execution plan, (c) received in a manner that specifies a first set of operations, and planned for execution using a second set of operations. An execution plan is a set of directives, such as a query tree structure, that is prepared for an execution engine. Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by the query or execution plan, if executed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
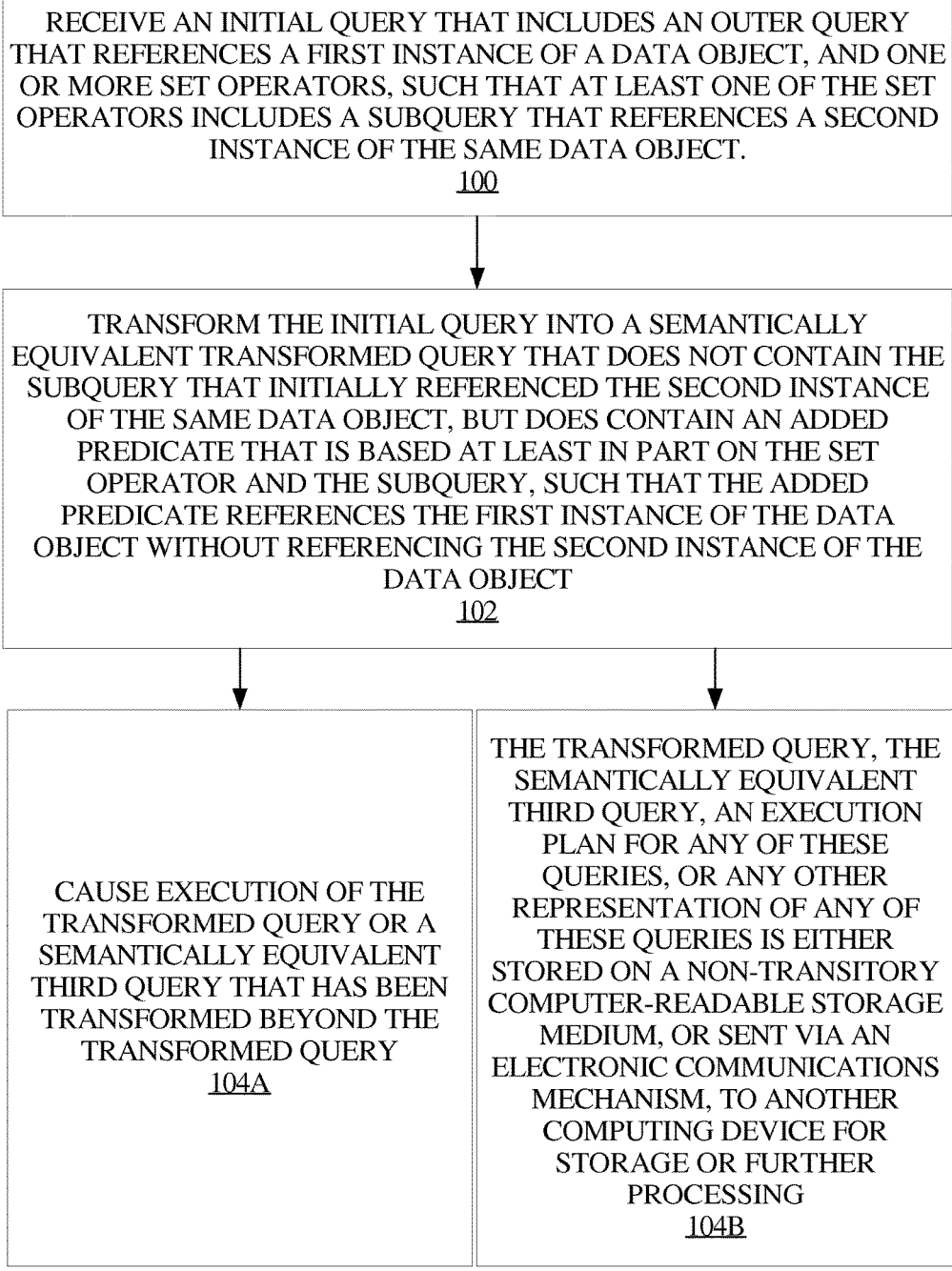
FIG. 1 illustrates an example process for transforming a query by eliminating a subquery.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.
General Overview Techniques are provided for transforming a query by eliminating a subquery. In one embodiment, a query processor such as an optimizer or execution engine transforms an initial query includes an outer query that references a first instance of a particular data object, such as a source object that is assigned to a first name in a FROM clause of the outer query. The initial query may also include one or more candidate set operators such as ANY, EXISTS, NOT EXISTS, ALL, IN, or NOT IN, and each of the candidate set operators may contain a subquery nested within the candidate set operator. At least one of the subqueries may reference a second, different, instance of the particular data object, such as a source object that is assigned to a second, different, name in a FROM clause of the respective subquery.

If the initial query was executed as-is without transformation, the different instances of the particular data object that are referenced in the initial query may cause separate instances of the particular data object to be loaded into memory and separately processed. Depending on the relationship between the outer query and the subquery, the initial query may cause the object instance referenced within the subquery to be recreated and reprocessed multiple times before the outer query is completed. For example, the object instance referenced in the subquery may be re-instantiated for each row of the outer query, and the rows of the outer query data object may correspond to rows of the data object that is referenced in the subquery. In a simple case where the referenced data object in the subquery has N rows (optionally accounting for filters) and is nested directly below the outer query, whose data object has M rows (optionally accounting for same or different filters than the outer query), the subquery data object may be instantiated M times for the subquery and one time for the outer query. In this simple example, the query processor would process a total of (N×M)+M rows of the data objects before the initial query is completed. In the example, the query processor would consume an amount of resources that is proportional to (N×M)+M, which increases rapidly depending on the number of rows, N and M, in the referenced instances of the data object. For medium to large data objects that are referenced in both the outer query and a subquery, this amount of consumed resources may cause a significant drain on the pool of available computing resources and/or may cause a significant delay in determining a result set for the initial query.

Instead of executing the initial query as-is without transformation, the query processor may transform the initial query to a transformed query that is based at least in part on the initial query. The transformed query may exclude the subquery or subqueries that initially referenced different instance(s) of the particular data object, and may also exclude the set operator(s) that included the subquery or subqueries. The transformed query may instead include an added predicate that is based at least in part on the subquery or subqueries that initially referenced different instance(s) of the particular data object. The added predicate may reference the first instance of the particular data object, which was initially referenced in the outer query, without referencing the different instance(s) of the particular data object that were initially referenced in the subquery. Although the transformed query may cause different underlying operations to be performed, the transformed query must be semantically equivalent to the initial query. In other words, the transformed query may be used instead of the initial query to determine a same result set that would have been determined by the initial query.

In the same or a different embodiment, the query processor or execution engine transforms an initial query that includes an outer query that references a first instance of a particular data object, such as a source object that is assigned to a first name in a FROM clause of the outer query. The initial query may also include one or more candidate predicates that specify conditions, and each of the candidate predicates may contain a subquery nested within the candidate predicate. At least one of the subqueries may reference a second, different, instance of the particular data object, such as a source object that is assigned to a second, different, name in a FROM clause of the respective subquery.

Instead of executing the initial query as-is without transformation, the query processor may transform the initial query to a transformed query that is based at least in part on the initial query. The transformed query may exclude the subquery or subqueries that initially referenced different instance(s) of the particular data object, and may also exclude the predicate that included the subquery or subqueries. The transformed query may instead include an added predicate that is based at least in part on the subquery or subqueries that initially referenced different instance(s) of the particular data object. The added predicate may reference the first instance of the particular data object, which was initially referenced in the outer query, without referencing the different instance(s) of the particular data object that were initially referenced in the subquery. Although the transformed query may cause different underlying operations to be performed, the transformed query must be semantically equivalent to the initial query. In other words, the transformed query may be used instead of the initial query to determine a same result set that would have been determined by the initial query.

Many applications have queries that contain a single-table subquery in their WHERE clause conjunction or disjunction. Under certain conditions, such a query can be optimized by eliminating the subquery according to the techniques described herein. If the query processor executes the transformed query instead of the initial query, the query processor may no longer need to load separate instances of the particular data object into memory or to separately process separate instances of the particular data object, since the subquery and the data objects contained therein are completely removed. In fact, the transformed query might not reference any instances of the particular data object other than the single instance that is referenced in the outer query. In this example, the object instance referenced in the outer query might be instantiated only a single time, and the query processor may process a total of n rows of the data object before the transformed query is completed. In the example, the query processor would consume an amount of resources that is proportional to N, which increases linearly depending on the number of rows, N, in the referenced data object. Even for medium to large data objects that are referenced in the outer query, this amount of consumed resources may cause an efficient use of the pool of available computing resources and/or may reduce any delay in determining a result set for the transformed query. In a practical example for a query that processed millions of rows, query execution time was reduced from hours for the initial query to seconds for the transformed query.

Various query processing steps described herein may be performed by computing device(s) that have been configured to perform the steps. For example, the computing device(s) may be configured with specialized software and/or specialized hardware to perform the steps. The specialized software and/or specialized hardware may utilize and extend general-purpose software and/or general-purpose hardware that provides general functionality. If specialized software is used to perform the described techniques, the specialized software may be stored in the form of instruction(s) on one or more non-transitory computer-readable media. The stored instruction(s) may be specially designed to cause computing device(s) to perform the various query processing steps.

FIG. 1 illustrates an example process for transforming a query by eliminating a subquery. In the example, an initial query is received in step 100. The initial query includes an outer query that references a first instance of a data object. The initial query also includes one or more set operators. At least one of the set operators includes a subquery that references a second instance of the same data object. In step 102, the initial query is transformed into a semantically equivalent transformed query that does not contain the set operator or the subquery that initially referenced the second instance of the same data object, but does contain an added predicate that is based at least in part on the set operator and the subquery that initially referenced the second instance of the same data object. The added predicate references the first instance of the data object without referencing the second instance of the data object. In step 104A, execution is caused for the transformed query or for a semantically equivalent third query that has been transformed beyond the transformed query. For example, the transformed query, the semantically equivalent third query, or an execution plan for any of these queries, or any other representation of any of these queries may be executed natively by the query processor or may be sent to an execution engine for execution. In step 104B, which may be performed instead of or in addition to step 104A, the transformed query, the semantically equivalent third query, an execution plan for any of these queries, or any other representation of any of these queries is either stored on a non-transitory computer-readable medium, or sent, via an electronic communications mechanism, to another computing device for storage or further processing.

Figure 2:
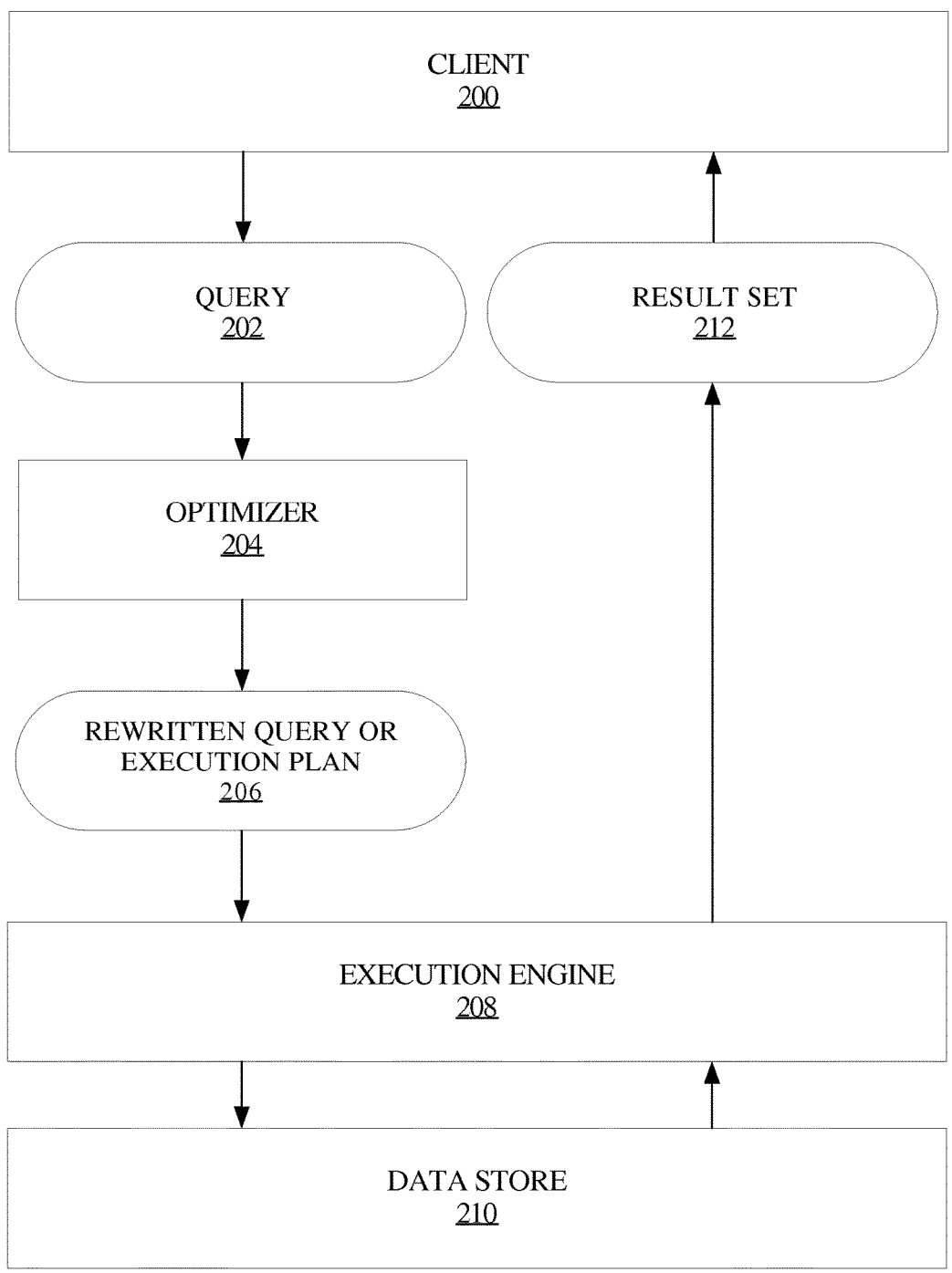
FIG. 2 illustrates an example server-client system for transforming and executing a query.

FIG. 2 illustrates an example server-client system for transforming and executing a query. In the example, client 200 sends a query 202 to optimizer 204. As shown, optimizer 204 is separate from execution engine 208. Optimizer 204 and execution engine 208 may operate on same or different devices and may have a high amount or low amount of integration with each other. Optimizer 204 rewrites the query or generates an execution plan that is based on the query or a transformation of the query. Optimizer sends the rewritten query or execution plan 206 to execution engine 208. Execution engine 208 then executes the rewritten query or execution plan 206 against data store 210 and returns result set 212 to client 200.

High-level concepts have been described for transforming a query by eliminating a subquery. Specific examples are provided herein to reinforce and deepen an understanding of these high-level concepts. However, the high-level concepts are not necessarily limited by these specific examples.

In various examples, an initial query with a set operator including a subquery in a WHERE clause or other portion of the query having filter condition(s) or special treatment for NULL values is transformed into a transformed query without the subquery in the WHERE clause or other portion of the query having filter condition(s) or special treatment for NULL values. In the examples, the subquery in the initial query references a different instance of a same data object than was referenced in an outer query of the initial query. The transformed query references the instance of the data object that was referenced in the outer query of the initial query, but the transformed query may exclude the instance of the data object or any references thereto that were previously referenced in the subquery.

Example of Handling Null Values During Subquery Elimination

In the same or a different embodiment as other examples described herein, the query processor determines that a set operator and a subquery nested in the set operator of the initial query defines a condition that is satisfied by any values of a set of values in the referenced data object. The condition may also have an exception for potential null values present in the data objects. For example, the condition may be defined by a set operator that is included within a relational comparison that applies differently to NULL values than to non-NULL values. For example, the ANY operator appears in a comparison specified by a relational operator, such as the equality operator ("="). Relational operators typically evaluate to FALSE if either input the relational operator is NULL. The ALL operator also appears in comparisons specified by relational operators, but differs from the ANY operator in that the ALL operator defines a condition that is satisfied by all values in the set rather than any value in the set.

As another example, the condition may be defined by a set operator that includes a subquery with predicates that apply differently to NULL values than to non-NULL values. For example, the EXISTS operator may contain a subquery that has a predicate that includes a relational operator that evaluates to NULL if either input to the relational operator is NULL.

Based at least in part on determining that the subquery and the corresponding set operator define a condition that is satisfied by any values of a set and that has an exception for potential null values, the query processor may eliminate the subquery and the set operator that included the subquery, and generate an added predicate to preserve the exception for potential null values. For example, a relational comparison of a null value with any other value always evaluate to FALSE, regardless of whether one or both values are NULL—this different treatment for NULL values is preserved to maintain semantic equivalence. For example, the added predicate may include added condition(s) that are based on whether or not column value(s) are NULL or are NOT NULL.

In the same or a different embodiment as other examples described herein, the query processor determines that a subquery of the initial query does not contain any filter predicates but that the initial query contains a connecting or correlating predicate that is associated with the subquery and that has an exception for potential null values.

As used herein, a "connecting predicate" is a predicate that includes a subquery that references a data object sourced from the subquery and a condition referencing a data object sourced outside the subquery. For example, the data object referenced within the subquery may be a first instance of a particular data object sourced from the subquery, and the data object referenced by the condition may be a second instance of the same particular data object, the second instance being sourced from the outer query.

As used herein, a "correlating predicate" is a predicate within a subquery that references both a data object sourced from the subquery and a data object sourced outside the subquery. For example, the data object sourced within the subquery may be a first instance of a particular data object, and the data object sourced outside the subquery may be a second instance of the same particular data object.

Based at least in part on determining that the initial query contains the correlating or connecting predicate that has the exception for potential null values, the query processor transforms the initial query by eliminating the subquery and generating an added predicate to preserve the exception for potential null values.

For example, the following query, Q1, contains a set operator, ANY( ), having a subquery, "SELECT Y.a FROM T1 Y," the set operator appearing in a WHERE clause of an outer query, "SELECT COUNT(X.b) FROM T1 X WHERE X.a=ANY (Z)," where Z is the subquery. As shown, the subquery and the outer query both reference the same data object, T1; the outer query instantiates T1 as "X", and the inner query instantiates T1 as "Y".

```
Q1:  SELECT COUNT(X.b)
     FROM T1 X
     WHERE X.a = ANY (SELECT Y.a
        FROM T1 Y);
```

The subquery in Q1 can be eliminated to result in transformed query, Q2. The transformation from Q1 to Q2 takes advantage of the fact that X and Y refer to the same table. In the case where X and Y refer to the same table, and where the same column of that table is referenced on both sides of an equivalence operation within a set operator such as ANY, a first instance of that column (X.a in the example) will always match at least one value (i.e., ANY) from a second instance of that column (Y.a as selected by SELECT Y.a FROM T1 Y in the example) unless the first instance of that column (X.a in the example) is NULL. relational operators such as the equality operator return FALSE if any input to the relational operator is NULL. For example, NULL=NULL typically evaluates to FALSE rather than TRUE. Therefore, the predicate, "X.a=ANY (SELECT Y.a FROM T1 Y)," is equivalent to "X.a IS NOT NULL." Therefore, in Q2, the predicate of the outer query ("X.a=ANY (SELECT Y.a FROM T1 Y)"), which includes the subquery, has been replaced with the equivalent predicate, "X.a IS NOT NULL."

```
Q2: SELECT COUNT(X.b)
    FROM T1 X
    WHERE X.a IS NOT NULL;
```

Example of Negating a Condition During Subquery Elimination

In the same or a different embodiment as other examples described herein, the query processor determines that a set operator and subquery of the initial query define a condition that is satisfied if and only if the condition is satisfied by all values of a set of values in the referenced data object. For example, the condition may be defined by a set operator that is satisfied only if separately satisfied by all values of the set such as the NOT EXISTS or ALL operators. For the ALL subquery, the columns involved in the connecting condition should not produce null values; otherwise, the connecting condition would evaluate to FALSE. Based at least in part on determining that the set operator and subquery define such a condition, the query processor may eliminate the subquery and generate an added predicate to preserve the condition. The added predicate may be based at least in part on a negation of the condition.

In the same or a different embodiment as other examples described herein, the query processor determines that a set operator and a subquery of the set operator in the initial query contains at least one filter predicate that defines at least one condition. The query processor may also determine that, when filter predicate(s) appear in the subquery, the columns involved in the connecting or correlating condition(s) associated with the subquery collectively form a unique key. The columns involved in the filter predicate(s) might or might not form a unique key. Based at least in part on determining that the columns involved in the correlating/connecting condition form a unique key, the query processor may then eliminate the subquery and generate an added predicate to preserve the condition defined by the at least one filter predicate.

For example, the following query, Q3, contains a set operator and subquery ("NOT EXISTS (SELECT 1 FROM T1 Y WHERE X.c=Y.c and X.d=Y.d and Y.b>2)") having a filter predicate ("Y.b>2") and predicates that, under the NOT EXISTS operator, cause special treatment for NULL values ("X.c=Y.c and X.d=Y.d"). Here the columns (T1.c, T1.d) form a unique key; that is, (T1.c, T1.d) have a unique value for each row of T1. As shown, the subquery and the outer query ("SELECT X.d FROM T1 X WHERE NOT EXISTS (Z)," where Z is the subquery) both reference the same data object, T1; the outer query instantiates T1 as "X", and the inner query instantiates T1 as "Y".

```
Q3: SELECT X.d
    FROM T1 X
    WHERE NOT EXISTS (SELECT 1
    FROM T1 Y
    WHERE X.c = Y.c and X.d = Y.d
    and Y.b > 2);
```

The subquery in Q3 can be eliminated to result in transformed query, Q4. The transformation from Q3 to Q4 takes advantage of the fact that X and Y refer to the same table. In the case where X and Y refer to the same table, and where the same columns of that table are referenced on both sides of equivalence operations under a set operator such as NOT EXISTS, a first instance of the columns (X.c and X.d in the example) will always match a corresponding row from a second instance of the columns (Y.c and Y.d in the example) since (T1.c, T1.d) form a unique key, unless the first instance of either of the columns (X.c or X.d in the example) is NULL. Therefore, the predicate, "X.c=Y.c," is equivalent to "X.c IS NOT NULL," and the predicate "X.d=Y.d" is equivalent to "Y.d IS NOT NULL." The predicate, "Y.b>2" is equivalent to "X.b>2" when X and Y refer to the same table.

In this example, the set operator, "NOT EXISTS," of Q3 has a negation. Because the operator is negated with "NOT," the filter predicates are also negated during transformation. Negation of a conjunctive predicate is equivalent to disjunction of negated atomic predicates. Similarly, negation of a disjunctive predicate is equivalent to conjunction of negated atomic predicates. In other words, NOT (A AND B AND C) is equivalent to (NOT A) OR (NOT B) OR (NOT C), and NOT (A OR B OR C) is equivalent to (NOT A) AND (NOT B) AND (NOT C). In the example, Y.b<2 is negated into Y.b<=2. "X.c IS NOT NULL" is negated to "X.c IS NULL" and "X.d IS NOT NULL" is negated to "X.d IS NULL." Therefore, in Q2, the predicate that includes the set operator and subquery ("NOT EXISTS (SELECT 1 FROM T1 Y WHERE X.c=Y.c and X.d=Y.d and Y.b>2)") has been replaced with the equivalent predicate, "X.b<=2 OR X.c IS NULL OR X.d IS NULL."

```
Q4 SELECT X.d
    FROM T1 X
    WHERE X.b <= 2 OR X.c IS NULL OR X.d IS NULL;
```

Rules for Determining Whether or not to Perform Subquery Elimination

In at least some of the examples described herein, the query processor may evaluate, prior to subquery elimination, rule(s) to determine whether or not to perform the subquery elimination. The rule(s) may define when subquery elimination is valid for a given system. Different rules may be used for different systems for which different expectations may be assumed, built-in, or already performed without requiring any checking by the query processor. For example, a query processor may expect to receive certain types of queries and may or may not perform any analysis to ensure that the received queries are of the expected types. If rule(s) are used for a given system, in one embodiment, subquery elimination may be performed whenever the rule(s) are satisfied.

In another embodiment, subquery elimination may be performed whenever rule(s) are satisfied, if rules are used, and whenever the subquery elimination is predicted to produce a more efficient query. In one example, different possible query transformations may be compared to each other using a cost-based approach, and different one(s) of the transformations may be selected based on the different predicted costs of the transformations or the subquery elimination may be performed on the basis of some heuristics. In one example, a query that instantiates a table multiple times, such as a possible query before subquery elimination, may be predicted to cost more than a query that instantiates the table a single time, such as a possible query after subquery elimination.

In one example, the query processor may determine whether or not a subquery within a set operator in the initial query contains at least one predicate in a WHERE clause of the subquery. The subquery, which is a candidate for elimination, may appear at any level of WHERE clause disjunction or conjunction. If the subquery contains at least one predicate in a WHERE clause of the subquery, the query processor may transform the initial query by generating an added predicate in the outer query based at least in part on the at least one predicate in the WHERE clause of the subquery.

The query processor may alternatively or additionally determine whether or not a subquery of the initial query does not reference any instances of any data objects other than the data object that is referenced by both the subquery and the outer query. The query processor may also determine whether or not a single predicate of the subquery references the second or different instance of that data object. Based at least in part on determining that the subquery does not reference any instances of any objects other than the data object that is referenced by both the subquery and the outer query and that the single predicate of the subquery references the second instance of the data object, the query processor may transform the initial query by eliminating the subquery and generating the added predicate.

The query processor may alternatively or additionally determine whether or not the outer query and a subquery reference a same column of a same table in a database. Based at least in part on determining that the outer query and the subquery reference the same column of the same table, the query processor may transform the initial query by eliminating the subquery and generating the added predicate.

The query processor may alternatively or additionally determine whether the subquery instantiates a single source table, whether the source table of the subquery is also a source table instantiated in the outer query, and/or whether a same column of the different instances of the same table is referenced in a "connecting predicate," which is a predicate that includes a subquery that references a data object sourced from the subquery and a condition referencing a data object sourced outside the subquery.

The query processor may alternatively or additionally determine whether or not any or all of the following conditions exist, and may perform subquery elimination after determining that any or all of the following conditions exist. Example conditions include:

- The set operator containing the subquery is of the type ANY, EXISTS, NOT EXISTS, or ALL. In other words, the subquery is an ANY subquery, an EXISTS subquery, a NOT EXISTS subquery, or an ALL subquery.
- The subquery instantiates a single base/view table, such as T1.
- The outer query instantiates the same table, such as T1. The outer query may contain other tables.
- The subquery includes a "connecting predicate," which is a predicate that includes a subquery that references a data object sourced from the subquery and a condition referencing a data object sourced outside the subquery. The connecting predicate comprises a condition that references both a first instance of a same column of a table sourced in an outer query and a second instance of the same column of the same table sourced in the subquery.
- For an ANY subquery, the connecting predicate contains an equality operator. For EXISTS, or NOT EXISTS subqueries, the correlating predicate contains an equality operator. For an ALL subquery, the connecting predicate contains an inequality operator.
- The columns in the connecting or correlating predicate form a unique key if the subquery contains any filter predicates.
- The connecting or correlating predicate is well-formed; that is, whether the connecting or correlating predicate is within the subquery or contains the subquery, the predicate contains exactly two columns one in each left and right operand, and one of the columns being sourced within the subquery and the other of the columns being sourced outside of the subquery. ALL or ANY subqueries have connecting predicates that contain subqueries, and EXISTS or NOT EXISTS subqueries do not have connecting predicates that contain subqueries but may have well-formed correlating predicates within subqueries.
- The subquery does not contain any subqueries, aggregation, grouping, or disjunction.

In one embodiment, if the subquery does not contain any filter predicates, then a set operator represented by the subquery becomes superfluous. In this embodiment, the query processor may replace the subquery with TRUE, FALSE, or 'IS [NOT] NULL' predicate, such as in the transformation from example query Q1 to example query Q2. In this type of subquery elimination, there is no unique key requirement for columns participating in connecting or correlating conditions.

In another embodiment, if the columns involved in a connecting predicate form a unique key, then a set operator (such as EXISTS, NOT EXISTS, ANY or ALL) that modifies the subquery may be converted into a relational comparison operator (such as IS NULL, IS NOT NULL, >, <, <=, or >=), and the table instantiated by the subquery can be eliminated by transferring the filter predicates of the eliminated instance of the table onto an equivalent instance of the table in the outer query, such as in the transformation from example query Q3 to example query Q4.

The query processor may determine that base table columns or view table columns involved in a connecting predicate form a unique key, or for which separate values are known by the query processor to be unique. For example, the query processor may determine that the columns involved in the connecting predicate form a unique key if any of the following conditions are true:

- The base table columns are rowids, which uniquely identify rows.
- The base table columns form a unique index, which is validated for uniqueness by a server executing the query or preparing the query for execution.
- The base table columns form a primary key, which is validated for uniqueness by a server executing the query or preparing the query for execution.
- The base table columns form a unique index, which is declared as RELY, for which an application submitting a query enforces uniqueness instead of a server executing the query or preparing the query for execution.
- The base table columns form a primary key, which is declared as RELY, for which an application submitting a query enforces uniqueness instead of a server executing the query or preparing the query for execution.
- If a GROUP-BY view is used, all GROUP-BY items appear in the select list of the GROUP-BY view, where the GROUP-BY operator eliminates duplicates among the items.
- If a view is used, each table, except for a semi-joined or anti-joined table, in the view has a unique key that appears in the view's select list, such that the view represents unique items.
- If a view is used, the view contains a DISTINCT key word or has UNION, INTERSECT or MINUS, each of which results in a view that represents unique set of values.

Example for Processing Subquery Elimination

In an example process, a query tree is constructed for a received query. The query tree may include multiple query blocks, each of which corresponds to a subquery or view. The query processor may access each query block in the query tree in a bottom-up manner, starting with the lowest-level subqueries and working up towards the highest-level outer query. For each query block, the query processor may traverse the WHERE clause of the query block looking for subqueries. The query processor then determines whether the subquery is valid for elimination based on rule(s) that apply to detected subqueries. If the subquery is valid for subquery elimination, then further subquery elimination steps are performed. Otherwise, the subquery elimination steps may be skipped for the subquery.

In one embodiment, subquery elimination checks and further steps are performed for an initial query before checking whether the query includes any subqueries that can be coalesced by the query processor, and/or before checking whether the query includes any subqueries that can be unnested by the query processor. The coalescing and/or unnesting optimizations may be performed after a subquery or some subqueries have been removed from the query.

If the subquery satisfies the rule(s) for subquery elimination, the query processor determines the table (for example, T') and column (for example, T'.C) that are referenced by a connecting predicate in the subquery. The subquery predicate is moved to the outer query and is replaced with constructed predicate P, which is expressed in terms of a corresponding outer query table T. In the example, the tables T and T' are different instances of the same table; in other words, the tables are equivalent.

If the subquery does not contain any filter predicates (for example, F), then F may be treated as a "TRUE" predicate. If the subquery does contain filter predicates and is an EXISTS or ANY subquery, then P is constructed to be equivalent to "F AND T.C IS NOT NULL." The predicate, "T.C IS NOT NULL," is added only if T.C is known to be nullable. If T.C is equivalent to (T.C1, T.C2) for separate columns C1 and C2, then T.C IS NOT NULL is equivalent to T.C1 IS NOT NULL AND T.C2 IS NOT NULL. Similarly in this case, T.C IS NULL is equivalent to T.C1 IS NULL OR T.C2 IS NULL.

If the subquery does contain filter predicates and is an ALL or NOT EXISTS subquery, then F is logically negated (for example, to N) to construct P. Negation involves converting conjunction into disjunction, disjunction into conjunction, and complimenting the relational operator of each predicate. If there are nullable columns in a filter predicate, then the nullable columns are negated. For example, the nullable columns may be negated using the LNNVL operator or some equivalent operator or combination of operators for the filter predicate. The LNNVL operator is similar to a NOT operator, but the LNNVL operator provides special treatment for NULL values. If a condition modified by the LNNVL operator evaluates to false or NULL, the LNNVL operator returns true. If the condition evaluates to true, the LNNVL operator returns false. For simplicity, various examples provided herein reference the LNNVL operator, but other known operators may be used to accomplish the same result as the LNNVL operator. For a NOT EXISTS subquery, P is constructed to be logically equivalent to "N OR T.C IS NULL". For an ALL subquery, P is constructed to be logically equivalent to "N AND T.C IS NOT NULL".

Before, during, or after the addition of P to the WHERE clause of the outer query, the query processor removes the subquery from the query block's subquery chain. The resulting query no longer includes that subquery, but does include the added predicate, P.

Examples of Eliminating Multiple Subqueries

If multiple subqueries are eliminated, the query processor may preserve logical relationships between the multiple eliminated subqueries. For example, the query processor may add logical operators such as AND or OR between multiple added predicates in the transformed query that have been generated based on multiple eliminated subqueries from the initial query.

For example, the following query, Q5, contains four subqueries at various levels of conjunction and disjunction. In the example, the columns T_10 K.unique1 and T_5 K.unique1 are unique and non-null.

As shown, the four example subqueries are: (1) "EXISTS (SELECT 1 FROM T_5 K T2 WHERE T1.unique1= T2.unique1 and T2.ten>5 and T2.unique3>11"; (2) "NOT EXISTS (SELECT 1 FROM T_10 K T3 WHERE T0.unique1=T3.unique1 and T3.hundred<45 and T3.unique3>22)"; (3) "ANY (SELECT T4.unique1 FROM T_10 K T4 WHERE T4.unique3>13 and T4.ten+1>7)"; and (4) "ALL (SELECT T5.unique1 FROM T_5 K T5 WHERE T5.hundred<35 and T5.unique3>10)." The first two subqueries are in disjunction with each other, and the last two subqueries are in equivalence operations that are in disjunction with each other. The disjunctive combination of the first two subqueries is in conjunction with the disjunctive combination of the last two subqueries.

```
Q5 SELECT COUNT(*)
    FROM T_10K T0, T_5K T1
    WHERE T1.thousand > 7 AND
        T0.ten = T1.ten AND
        (EXISTS (SELECT 1
    FROM T_5K T2
    WHERE T1.unique1 = T2.unique1 and
        T2.ten > 5 and T2.unique3 > 11)
    OR
        NOT EXISTS (SELECT 1
    FROM T_10K T3
    WHERE T0.unique1 = T3.unique1 and
        T3.hundred < 45 and T3.unique3 > 22))
AND
    (T0.unique1 =ANY (SELECT T4.unique1
        FROM T_10K T4
        WHERE T4.unique3 > 13 and
            T4.ten + 1 > 7)
    OR
    T1.unique1 !=ALL (SELECT T5.unique1
        FROM T_5K T5
        WHERE T5.hundred < 35 and
            T5.unique3 > 10));
```

An example execution plan for Q5 is provided below. The execution plan shows, for each underlying database operation that is triggered by query Q5, the names of tables or data objects that would be accessed, numbers of rows that would be accessed from the data objects, and the cost or percentage of processing time that would be used by the underlying operation. The execution plan also shows the predicate or operation identifier that triggers the underlying operations, and the order that these operations would be performed by an execution plan that is executing query Q5.

| | EXECUTION PLAN FOR Q5: | | | |
|---|---|---|---|---|
| Id | Operation | Name | Rows | Cost (% CPU) |
| 0 | SELECT STATEMENT | | 1 | 11546 (5) |
| 1 | SORT AGGREGATE | | 1 | |
| * 2 | FILTER | | | |
| * 3 | HASH JOIN | | 4964K | 481 (88) |
| * 4 | TABLE ACCESS FULL | T_5K | 4965 | 24 (9) |
| 5 | TABLE ACCESS FULL | T_10K | 10000 | 43 (7) |
| * 6 | TABLE ACCESS BY INDEX ROWID | T_5K | 1 | 2 (0) |
| * 7 | INDEX UNIQUE SCAN | T_5K_UNIQUE1 | 1 | 1 (0) |
| * 8 | TABLE ACCESS BY INDEX ROWID | T_10K | 1 | 2 (0) |
| * 9 | INDEX UNIQUE SCAN | T_10K_UNIQUE1 | 1 | 1 (0) |
| * 10 | TABLE ACCESS BY INDEX ROWID | T_10K | 1 | 2 (0) |

EXECUTION PLAN FOR Q5:

| Id | Operation | Name | Rows | Cost (% CPU) |
|---|---|---|---|---|
| * 11 | INDEX UNIQUE SCAN | T_10K_UNIQUE1 | 1 | 1 (0) |
| * 12 | TABLE ACCESS BY INDEX ROWID | T_5K | 1 | 2 (0) |
| * 13 | INDEX UNIQUE SCAN | T_5K_UNIQUE1 | 1 | 1 (0) |

Predicate Information (Identified by Operation Id):

```
2 filter((EXISTS (SELECT 0 FROM T_5K T2 WHERE
      T2.UNIQUE1=:B1 AND T2.TEN>5 AND
      T2.UNIQUE3>11) OR NOT EXISTS (SELECT 0 FROM
      T_10K T2 WHERE T2.UNIQUE1=:B2 AND
      T2.HUNDRED<45 AND T2.UNIQUE3>22)) AND (EXISTS
      (SELECT 0 FROM T_10K T2 WHERE
      T2.UNIQUE1=:B3 AND T2.TEN+1>7 AND T2.UNIQUE3>13)
      OR NOT EXISTS (SELECT 0 FROM T_5K T2 WHERE
      T2.UNIQUE1=:B4 AND T2.HUNDRED<35 AND
      T2.UNIQUE3>10)))
3 access(T0.TEN=T1.TEN)
4 filter(T1.THOUSAND>7)
6 filter(T2.TEN>5 AND T2.UNIQUE3>11)
7 access(T2.UNIQUE1=:B1)
8 filter(T2.HUNDRED<45 AND T2.UNIQUE3>22)
9 access(T2.UNIQUE1=:B1)
10 filter(T2.TEN+1>7 AND T2.UNIQUE3>13)
11 access(T2.UNIQUE1=:B1)
12 filter(T2.HUNDRED<35 AND T2.UNIQUE3>10)
13 access(T2.UNIQUE1=:B1)
```

The query processor may transform query Q5 into transformed query Q6 using the subquery elimination techniques described herein. In query Q6, the four example subqueries have all been eliminated and replaced with added predicates in respective positions of the outer query's WHERE clause. In Q6, the added conjunctive predicates of "T1.TEN>5" and "T1.UNIQUE3>11" correspond to conjunctive predicates that referenced T2 in the first example subquery; the added disjunctive predicates of "LNNVL(T0.HUNDRED<45)" and "LNNVL (T0.UNIQUE3>22)" correspond to conjunctive predicates that referenced T3 in the second example subquery and that have been negated in light of the NOT EXISTS set operator; the added conjunctive predicates of "T0.UNIQUE3>13" and "T0.TEN+1>7" correspond to conjunctive predicates that referenced T4 in the third example subquery; the added disjunctive predicates of "LNNVL (T1.HUNDRED<35" and "LNNVL(T1.UNIQUE3>10" correspond to conjunctive predicates that referenced T5 in the fourth example subquery and that have been negated in light of the ALL set operator.

In this example, the subqueries each reference different instances of tables that are referenced in the outer query. Example queries 1 and 4 reference an object instance that is equivalent to T1, and example queries 2 and 3 reference an object instance that is equivalent to T0.

```
Q6 SELECT COUNT(*)
    FROM T_10K T0, T_5K T1
    WHERE T1.thousand > 7 AND T0.ten = T1.ten AND
    ((T1.TEN > 5 AND T1.UNIQUE3 > 11) OR
    (LNNVL(T0.HUNDRED < 45) OR LNNVL(T0.UNIQUE3 > 22)))
    AND
    ((T0.UNIQUE3 > 13 AND T0.TEN + 1 > 7) OR
    (LNNVL(T1.HUNDRED < 35) OR LNNVL(T1.UNIQUE3 > 10)));
```

An example execution plan for Q6 is provided below. The execution plan uses significantly fewer operations to perform Q6 at least partially because the four subqueries have been removed from Q5 to form Q6. As a result, the select statement with an ID of 0 has a much lower cost than the corresponding select statement of Q5. Also, the filter step 2 of query 5, and the table access by index and index unique scan steps 6-13 from Q5 are no longer required in Q6. In the example, the performance improvement of Q6 over Q5 is significant, and the performance improvement may be even greater if Q5 did not utilize indices.

EXECUTION PLAN FOR Q6:

| Id | Operation | Name | Rows | Cost (% CPU) |
|---|---|---|---|---|
| 0 | SELECT STATEMENT | | 1 | 481 (88) |
| 1 | SORT AGGREGATE | | 1 | |
| *2 | HASH JOIN | | 2107K | 481 (88) |
| *3 | TABLE ACCESS FULL | T_5K | 4965 | 24 (9) |
| 4 | TABLE ACCESS FULL | T_10K | 10000 | 43 (7) |

Predicate Information (Identified by Operation Id):

```
2 - access(T0.TEN=T1.TEN)
    filter((T1.TEN>5 AND T1.UNIQUE3>11 OR
    LNNVL(T0.HUNDRED<45) OR LNNVL(T0.UNIQUE3>22)) AND
    (T0.UNIQUE3>13 AND T0.TEN+1>7 OR
    LNNVL(T1.HUNDRED<35)
    LNNVL(T1.UNIQUE3>10)))
3 - filter(T1.THOUSAND>7)
```

OR

As another example, the following query, Q7, contains four subqueries at various levels of conjunction and disjunction, each using the IN or NOT IN set operators: (1) "USERNAME IN (SELECT USERNAME FROM USERS WHERE TYPE=1 AND AGE>=40"; (2) "USERNAME NOT IN (SELECT USERNAME FROM USERS WHERE TYPE=1 AND AGE<=20)"; (3) "USERNAME NOT IN (SELECT USERNAME FROM USERS WHERE TYPE=1 AND MEMBERSHIP !='PREFERRED'"; and (4) "USERNAME IN (SELECT USERNAME FROM USERS WHERE TYPE=1 AND REGION='USA')". Q7 also has a primary key RELY constraint. The cardinality of table USERS is about 5B.

```
Q7 SELECT COUNT(*)
    FROM USERS u1
    WHERE TYPE = 1 AND
    (USERNAME IN (SELECT USERNAME
        FROM USERS
        WHERE TYPE = 1 AND
        AGE >= 40)
    OR
    USERNAME NOT IN (SELECT USERNAME
        FROM USERS
        WHERE TYPE = 1 AND
        AGE <= 20))
    AND (USERNAME NOT IN (SELECT USERNAME
```

```
        FROM USERS
        WHERE TYPE = 1 AND
            MEMBERSHIP != 'PREFERRED')
    OR
    USERNAME IN (SELECT USERNAME
        FROM USERS
        WHERE TYPE = 1 AND REGION ='USA'));
```

In an example computer system, the elapsed time for executing Q7 exceeded 6 hours. The query processor may perform subquery elimination on Q7 to generate Q8. In the example computer system, Q8 completed within 30 seconds.

In Q8, the subqueries have been removed and replaced with corresponding added predicates. The predicates from the second and third subqueries were negated due to the "NOT IN" operator in these subqueries.

```
    Q8 SELECT COUNT(*)
        FROM USERS u1
        WHERE TYPE = 1 AND
        (U1.AGE >= 40 OR
        U1.TYPE <> 1 OR LNNVL(U1.AGE <= 20))
        AND
        (U1.TYPE <> 1 OR U1.REGION = USA' OR
        LNNVL(SC.MEMBERSHIP <> 'PREFERRED'));
```

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
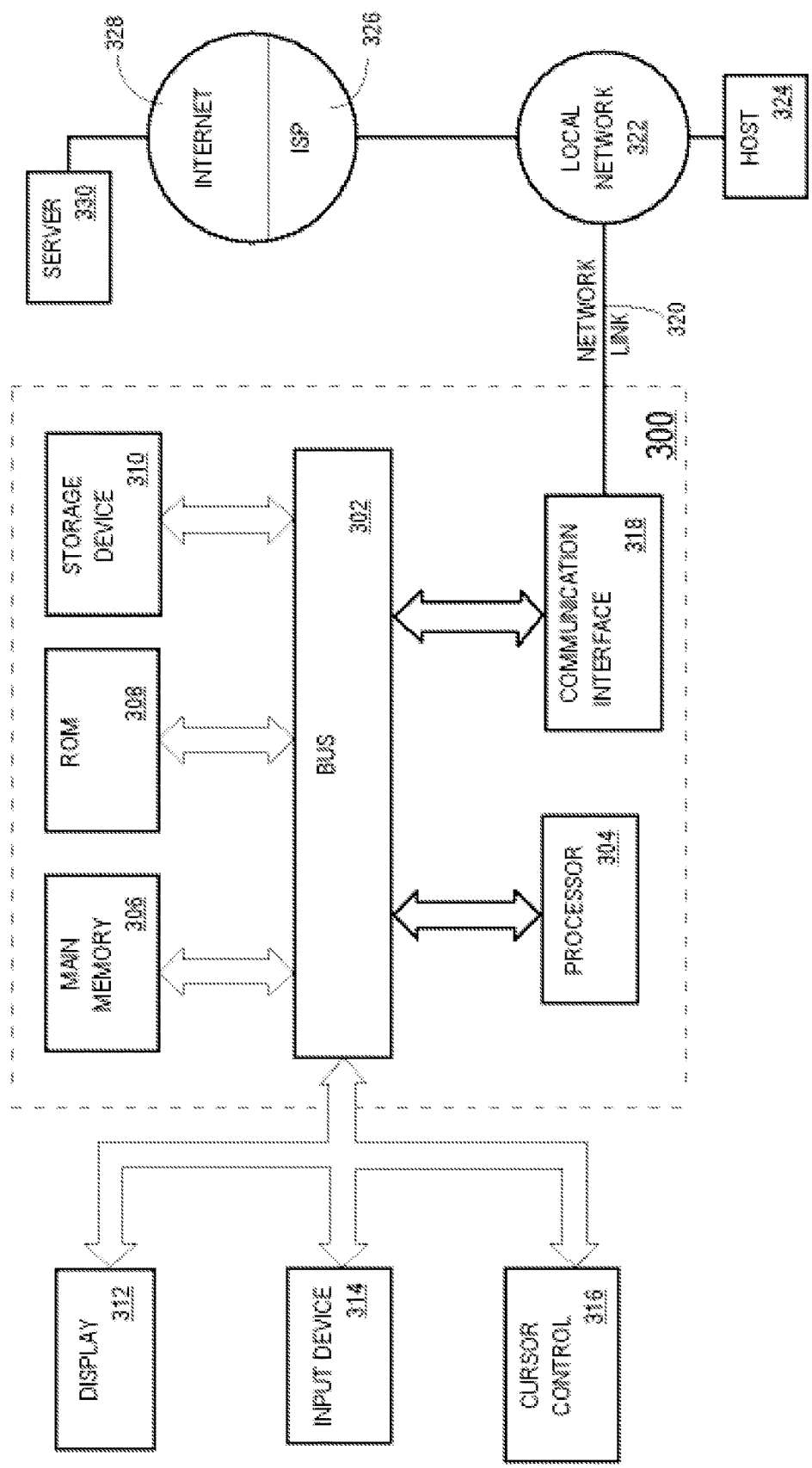
FIG. 3 illustrates an example computer system for performing various combinations of steps described herein.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

As used herein, the terms "first," "second," "third," and "particular" are used as naming conventions to distinguish different queries, steps, objects, devices, or other items from each other, so that these different items may be referenced after they have been introduced. The use of these terms does not imply an ordering or timing.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a first query comprising an outer query that:
includes one or more set operators;
instantiates a particular data object using a first name;
references a first instance of the particular data object using said first name;
wherein at least a particular set operator of the one or more set operators includes a particular subquery that:
instantiates the particular data object using a second name;
references a second instance of the particular data object using said second name;
based at least in part on the first query, transforming the first query to a second query that does not contain at least the particular subquery or the particular set operator; wherein the second query comprises an added predicate that is based at least in part on the particular subquery; wherein the added predicate references the first instance of the particular data object using said first name without referencing the second instance of the particular data object using said second name; and wherein the second query is semantically equivalent to the first query;
generating an execution plan for executing the second query;
causing execution of the second query instead of the first query based on the execution plan for executing the second query;
wherein the method is performed by one or more computing devices.

2. The method of claim 1, further comprising:
determining that the particular subquery does not contain any filter predicates but contains a connecting or correlating predicate that applies differently to null values than to non-null values;
based at least in part on determining that the particular subquery contains the connecting or correlating predicate that applies differently to null values than to non-null values, eliminating the particular subquery and generating the added predicate such that the added predicate applies differently to null values than to non-null values.

3. The method of claim 1, further comprising:
determining that the particular subquery contains at least one filter predicate and at least one connecting or correlating predicate that define conditions;
determining that all connecting or correlating predicates reference columns of the second instance that are collectively unique-valued;
based at least in part on determining that all connecting or correlating predicates reference the columns of the second instance that are collectively unique-valued, eliminating the particular subquery and generating the added predicate to preserve the conditions defined by the at least one filter predicate and the at least one connecting or correlating predicate.

4. The method of claim 1, further comprising:
determining that the particular set operator comprises a condition that is satisfied for a set of values if and only if the condition is satisfied individually by all values of the set;
based at least in part on determining that the particular set operator comprises the condition, eliminating the particular subquery and the particular set operator, and generating the added predicate to preserve the condition, wherein the added predicate is based at least in part on a negation of the condition.

5. The method of claim 4, wherein the condition is defined at least in part by at least one of a NOT EXISTS operator or an ALL operator.

6. The method of claim 1, further comprising:
determining that the particular set operator comprises a condition that is satisfied for a set of values if the condition is satisfied individually by any values of the set, wherein the condition applies differently to null values than to non-null values;
based at least in part on determining that the particular set operator comprises the condition, eliminating the particular subquery and the particular set operator, and generating the added predicate such that the added predicate applies differently to null values than to non-null values.

7. The method of claim 6, wherein the condition is defined at least in part by at least one of an EXISTS operator or an ANY operator.

8. The method of claim 1, wherein the particular subquery contains at least one predicate in a WHERE clause of the particular subquery, wherein the added predicate is based at least in part on the at least one predicate in the WHERE clause of the particular subquery, and wherein the added predicate is in a WHERE clause of the outer query.

9. The method of claim 1, further comprising:
determining that the particular subquery does not reference any instances of any data objects other than the particular data object and that a single predicate of the particular subquery references the second instance of the particular data object;
based at least in part on determining that the particular subquery does not reference any instances of any data objects other than the particular data object and that the single predicate of the particular subquery references the second instance of the particular data object, eliminating the particular subquery and generating the added predicate.

10. The method of claim 1, wherein the particular data object is a particular table in a database, the method further comprising:
determining that the outer query and the particular subquery reference a same column of the particular table;
based at least in part on determining that the outer query and the particular subquery reference a same column of the particular table, eliminating the particular subquery and generating the added predicate.

11. The method of claim 1, further comprising preserving logical relationships between multiple eliminated subqueries, by adding logical operators between multiple added predicates that have been generated based on the multiple eliminated subqueries.

12. The method of claim 1, further comprising generating an execution plan for executing the second query instead of the first query; wherein execution of the second query is caused based at least in part on the execution plan.

13. One or more non-transitory computer-readable storage media storing sequences of instructions that, when executed by one or more computing devices, cause:
receiving a first query comprising an outer query that:
includes one or more set operators;
instantiates a particular data object using a first name;
references a first instance of the particular data object using said first name;
wherein at least a particular set operator of the one or more set operators includes a particular subquery that:
instantiates the particular data object using a second name;
references a second instance of the particular data object using said second name;
based at least in part on the first query, transforming the first query to a second query that does not contain at least the particular subquery or the particular set operator; wherein the second query comprises an added predicate that is based at least in part on the particular subquery; wherein the added predicate references the first instance of the particular data object using said first name without referencing the second instance of the particular data object using said second name; and wherein the second query is semantically equivalent to the first query;
generating an execution plan for executing the second query;
causing execution of the second query instead of the first query based on the execution plan for executing the second query.

14. The one or more non-transitory computer-readable storage media of claim 13, wherein the sequences of instructions include instructions that, when executed by said one or more computing devices, cause:
determining that the particular subquery does not contain any filter predicates but contains a connecting or correlating predicate that applies differently to null values than to non-null values;
based at least in part on determining that the particular subquery contains the connecting or correlating predicate that applies differently to null values than to non-null values, eliminating the particular subquery and generating the added predicate such that the added predicate applies differently to null values than to non-null values.

15. The one or more non-transitory computer-readable storage media of claim 13, wherein the sequences of instructions include instructions that, when executed by said one or more computing devices, cause:
determining that the particular subquery contains at least one filter predicate and at least one connecting or correlating predicate that define conditions;
determining that all connecting or correlating predicates reference columns of the second instance that are collectively unique-valued;
based at least in part on determining that all connecting or correlating predicates reference the columns of the second instance that are collectively unique-valued, eliminating the particular subquery and generating the added predicate to preserve the conditions defined by the at least one filter predicate and the at least one connecting or correlating predicate.

16. The one or more non-transitory computer-readable storage media of claim 13, wherein the sequences of instructions include instructions that, when executed by said one or more computing devices, cause:
determining that the particular set operator comprises a condition that is satisfied for a set of values if and only if the condition is satisfied individually by all values of the set;
based at least in part on determining that the particular set operator comprises the condition, eliminating the particular subquery and the particular set operator, and generating the added predicate to preserve the condition, wherein the added predicate is based at least in part on a negation of the condition.

17. The one or more non-transitory computer-readable storage media of claim 16, wherein the condition is defined at least in part by at least one of a NOT EXISTS operator or an ALL operator.

18. The one or more non-transitory computer-readable storage media of claim 13, wherein the sequences of instructions include instructions that, when executed by said one or more computing devices, cause:

determining that the particular set operator comprises a condition that is satisfied for a set of values if the condition is satisfied individually by any values of the set, wherein the condition applies differently to null values than to non-null values;

based at least in part on determining that the particular set operator comprises the condition, eliminating the particular subquery and the particular set operator, and generating the added predicate such that the added predicate applies differently to null values than to non-null values.

19. The one or more non-transitory computer-readable storage media of claim 18, wherein the condition is defined at least in part by at least one of an EXISTS operator or an ANY operator.

20. The one or more non-transitory computer-readable storage media of claim 13, wherein the particular subquery contains at least one predicate in a WHERE clause of the subquery, wherein the added predicate is based at least in part on the at least one predicate in the WHERE clause of the particular subquery, and wherein the added predicate is in a WHERE clause of the outer query.

21. The one or more non-transitory computer-readable storage media of claim 13, wherein the sequences of instructions include instructions that, when executed by said one or more computing devices, cause:

determining that the particular subquery does not reference any instances of any data objects other than the particular data object and that a single predicate of the particular subquery references the second instance of the particular data object;

based at least in part on determining that the particular subquery does not reference any instances of any data objects other than the particular data object and that the single predicate of the particular subquery references the second instance of the particular data object, eliminating the particular subquery and generating the added predicate.

22. The one or more non-transitory computer-readable storage media of claim 13, wherein the particular data object is a particular table in a database, wherein the sequences of instructions include instructions that, when executed by said one or more computing devices, cause:

determining that the outer query and the particular subquery reference a same column of the particular table;

based at least in part on determining that the outer query and the particular subquery reference a same column of the particular table, eliminating the particular subquery and generating the added predicate.

23. The one or more non-transitory computer-readable storage media of claim 13, wherein the sequences of instructions include instructions that, when executed by said one or more computing devices, cause preserving logical relationships between multiple eliminated subqueries, by adding logical operators between multiple added predicates that have been generated based on the multiple eliminated subqueries.

24. The one or more non-transitory computer-readable storage media of claim 13, wherein the sequences of instructions include instructions that, when executed by said one or more computing devices, cause generating an execution plan for executing the second query instead of the first query; wherein execution of the second query is caused based at least in part on the execution plan.

25. A method comprising:

receiving a first query comprising an outer query that:
    includes one or more predicates;
    instantiates a particular data object using a first name;
    references a first instance of the particular data object using said first name;
    wherein at least a particular predicate of the one or more predicates includes a particular subquery that:
    instantiates the particular data object using a second name;
    references a second instance of the particular data object using said second name;
    based at least in part on the first query, transforming the first query to a second query that does not contain at least the particular subquery or the particular predicate;
    wherein the second query comprises an added predicate that is based at least in part on the particular subquery; wherein the added predicate references the first instance of the particular data object using said first name without referencing the second instance of the particular data object using said second name; and wherein the second query is semantically equivalent to the first query;
    generating an execution plan for executing the second query;
    causing execution of the second query instead of the first query based on the execution plan for executing the second query;
    wherein the method is performed by one or more computing devices.

26. One or more non-transitory computer-readable storage media storing sequences of instructions that, when executed by one or more computing devices, cause:

receiving a first query comprising an outer query that:
    includes one or more predicates;
    instantiates a particular data object using a first name;
    references a first instance of the particular data object using said first name;
    wherein at least a particular predicate of the one or more predicates includes a particular subquery that:
    instantiates the particular data object using a second name;
    references a second instance of the particular data object using said second name;
    based at least in part on the first query, transforming the first query to a second query that does not contain at least the particular subquery or the particular predicate;
    wherein the second query comprises an added predicate that is based at least in part on the particular subquery; wherein the added predicate references the first instance of the particular data object using said first name without referencing the second instance of the particular data object using said second name; and wherein the second query is semantically equivalent to the first query;
    generating an execution plan for executing the second query;
    causing execution of the second query instead of the first query based on the execution plan for executing the second query.

* * * * *

UNITED STATES PATENT AND TRADEMARK OFFICE
CERTIFICATE OF CORRECTION

PATENT NO. : 10,133,776 B2
APPLICATION NO. : 13/923216
DATED : November 20, 2018
INVENTOR(S) : Ahmed et al.

Page 1 of 1

It is certified that error appears in the above-identified patent and that said Letters Patent is hereby corrected as shown below:

In the Specification

In Column 2, Line 62, delete "vise" and insert -- vice --, therefor.

In Column 8, Line 29, delete "relational" and insert -- Relational --, therefor.

In Column 9, Line 55, delete "negatation" and insert -- negation --, therefor.

In the Claims

In Column 24, Line 36, in Claim 26, delete "storing sequences of instructions" and insert -- storing instructions --, therefor.

Signed and Sealed this
Second Day of March, 2021

Drew Hirshfeld
*Performing the Functions and Duties of the
Under Secretary of Commerce for Intellectual Property and
Director of the United States Patent and Trademark Office*